United States Patent Office.

JULIUS EDMUND DOTCH, OF WASHINGTON, DISTRICT OF COLUMBIA.

Letters Patent No. 108,983, dated November 8, 1870; antedated October 29, 1870.

IMPROVEMENT IN PRESERVING MEAT, FISH, OYSTERS, &c.

The Schedule referred to in these Letters Patent and making part of the same.

*To all whom it may concern:*

Be it known that I, JULIUS EDMUND DOTCH, of the city of Washington, District of Columbia, have invented a new and improved Mode of Preserving Meats, Poultry, Fish, Oysters, &c.; and I do hereby declare that the following is a full and exact description thereof.

The nature of my invention consists in using thymol or thymic acid, or any of the thymate salts in solutions of water, or alcohol, or glycerine, or any or all of them mixed together in any proportion; or I use thymol as admixture in any of the various processes described and patented by me in patent No. 84,481, dated December 1, 1868, and Patent No. 93,183, dated August 3, 1869; or I simply rub the meat, &c., with any of the thymate salts, or employ them in any possible solution; or I evaporate the thymol and introduce the vapors into a closed room or any refrigerator containing the meat.

Meat preserved in this manner I cover with the same substances I have already patented in No. 93,183, dated August 3, 1869.

I also mix any of the salts, or mixtures with them named in my patents No. 84,481 and No. 93,183 with pulverized coal and melted tallow, or paraffine, or stearine, to which I add some one or more of the different stearoptens of the ethereal or aromatic oils, or any of the phenate salts, and pack the meats, &c., in layers between these preparations.

What I claim as my invention, and desire to secure by Letters Patent, is—

1. The preserving of meats, oysters, fish, &c., by the use of thymol, or thymic acid, or any thymate salts, either alone or in solutions of water, or alcohol, or glycerine, or any or all of them, mixed together in any proportion, or in any other fluid or solvent in which thymol or thymate salts are soluble.

2. The preserving of meats, oysters, &c., by the use of thymol vapors introduced into closed vessels or refrigerators containing the meat, &c.

3. The use of thymol or thymate salts, in combination with any of the various processes already patented by me in patents No. 84,481 and No. 93,183.

4. The stearoptens and their salts, of oil of cumin, lavender, horsemint, hoarhound, burgamot, and all other ethereal or essential aromatic oils and essences of fruit, for the preservation of meats, oysters, vegetables, and dead bodies in general.

5. The vapors of the different stearoptens, either for inhalation or injection into the bodies, or for introduction into closed vessels or refrigerators.

6. The mixtures of those stearoptens or their vapors, in combination with any of the existing gases.

7. The impregnation of melted tallow, paraffine, or stearine with one or more of the different stearoptens, or any of the phenate salts, for packing and covering.

JULIUS EDMUND DOTCH.

Witnesses:
JOHN MOSELY.
AARON STOUT.